R. M. VAN VLEET.
ELECTRIC GENERATING SYSTEM.
APPLICATION FILED JUNE 14, 1920.
1,389,716.
Patented Sept. 6, 1921.
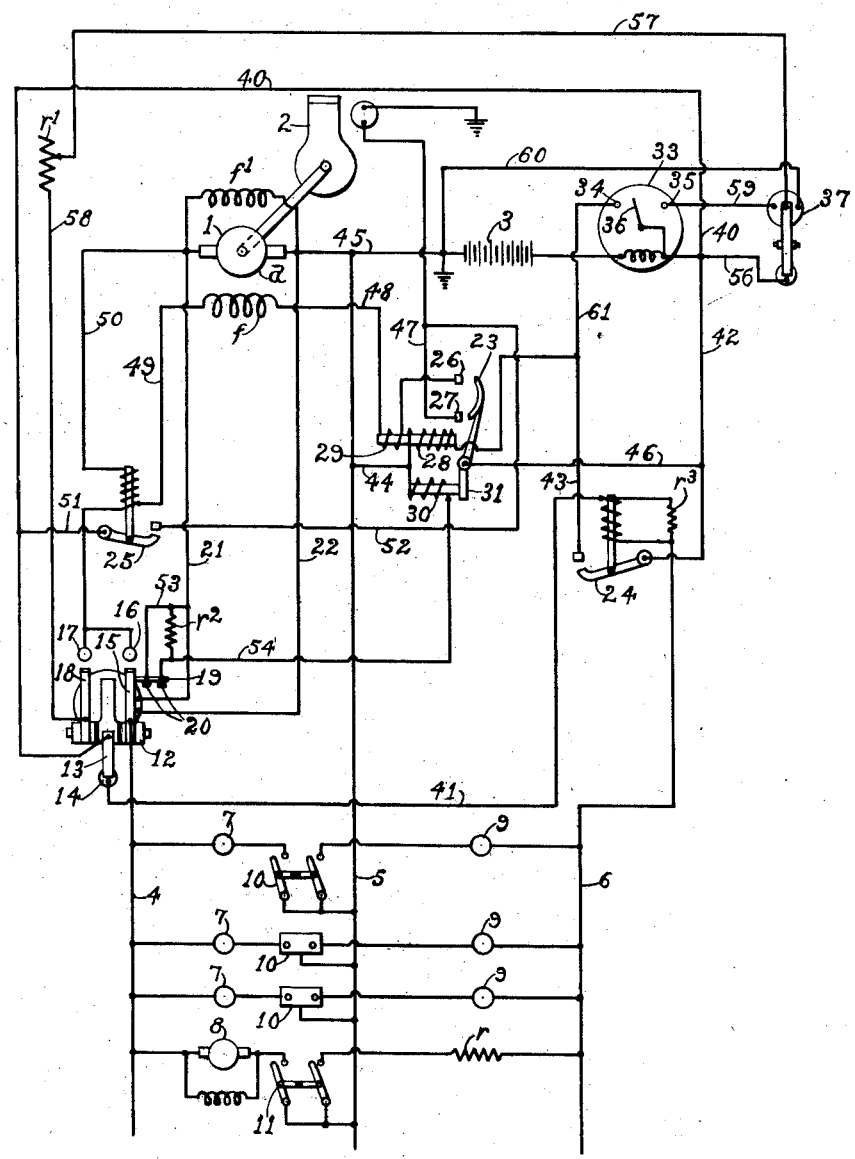
Inventor
Roy M. VanVleet
By Frank H. Hubbard
Attorney

UNITED STATES PATENT OFFICE.

ROY M. VAN VLEET, OF MILWAUKEE, WISCONSIN, ASSIGNOR TO THE CUTLER-HAMMER MFG. CO., OF MILWAUKEE, WISCONSIN, A CORPORATION OF WISCONSIN.

ELECTRIC GENERATING SYSTEM.

1,389,716.  Specification of Letters Patent.  Patented Sept. 6, 1921.

Application filed June 14, 1920. Serial No. 388,731.

*To all whom it may concern:*

Be it known that I, ROY M. VAN VLEET, a citizen of the United States, residing at Milwaukee, in the county of Milwaukee and State of Wisconsin, have invented new and useful Improvements in Electric Generating Systems, of which the following is a full, clear, concise, and exact description, reference being had to the accompanying drawing, forming a part of this specification.

This invention relates to isolated electric generating plants or systems.

Heretofore it has been proposed to provide an isolated plant for supplying 110 volts, a generator driven by an internal combustion engine being employed to supply current for all loads and a relatively low voltage battery being employed solely for starting the engine. Such a plant has various obvious advantages over those limited to lower voltages or requiring large batteries but the same is nevertheless uneconomical for light loads.

The present invention has among its objects to provide a more economical system employing in conjunction with a similar generator, a relatively low voltage battery to be used for starting and also for supplying current for light loads without starting the generator.

Another object is to provide a system including means limiting the load which may be placed on the battery and responsive to transfer the load from the battery to the generator automatically.

Another object is to provide a system including automatic means to transfer the load from the battery to the generator in response to variations in either the load or the condition of charge of the battery.

Another object is to provide a system including automatic means subjected to control both by the load and condition of the battery to transfer the load back to the battery.

Various other objects and advantages of the invention will hereinafter appear.

According to the present invention it is proposed to provide a three wire system affording two circuits, one to be supplied by the generator *per se* and the other by the battery *per se*, means being provided to utilize the battery for starting the engine, driving the generator and for subjecting the battery to charging current supplied by the generator. Further, it is proposed to provide both circuits with lamps or other translating devices suited to the different voltages of said circuits and to provide means responsive to variations in load and condition of the battery for automatically starting and stopping the engine driving the generator and controlling the continuity of each supply circuit.

The accompanying drawing diagrammatically illustrates one embodiment of the invention which will now be described, it being understood that the system illustrated is susceptible of various modifications without departing from the scope of the appended claims.

Referring to the drawing the same diagrammatically illustrates a generator 1, a gas engine 2 for driving the same, a storage battery 3 and a three wire load circuit having lines 4 and 5 supplied by the generator *per se* and lines 5 and 6 supplied by the battery *per se*. In practice it is preferred to employ a generator capable of supplying 110 volts and a 32 volt battery, although the system might be designed for other voltages if desired. The generator has an armature "$a$," a series field "$f$" and a shunt field "$f^1$" and is designed to function as a motor for starting the engine 2 when supplied with current from the battery 3.

The circuit 4—5 is shown as provided with a number of lamps 7 and a motor 8 suited to the generator voltage while the circuit 5—6 is shown as provided with a number of lamps 9 suited to the battery voltage. The lamps are provided with control switches 10, each of which functions to connect a lamp 7 across circuit 4—5 and a lamp 9 across circuit 5—6. These switches are preferably of the double pole push type and a similar switch 11 is provided for connecting motor 8 across circuit 4—5 and for connecting a resistance "$r$" across circuit 5—6 for a purpose hereinafter set forth. As will be understood, any suitable number of lamps, motors or other translating devices may be connected in each circuit.

The continuity of the circuits 4—5 and 5—6 is controlled by an electro-magnetic switch 12 having normally engaged contacts 13 and 14 to connect line 6 to one side of the battery, normally disengaged contacts 15 and 16 to connect line 4 to one side of the generator, line 5 being permanently connected to one side of the generator and one terminal of the battery. Thus with the switch 12 deënergized the battery is adapted to supply current to circuit 5—6 for energization of the lamps 9, the circuit 4—5 being interrupted. On the other hand, with the switch 12 energized the circuit 4—5 is completed for energization of the lamps 7 and motor 8 by current from the generator, the circuit 5—6 being interrupted. Switch 12 also has normally disengaged contacts 17 and 18 controlling connections for subjecting the battery 3 to charging current from the generator 1, said connections including a resistance "$r^1$" to suitably reduce the voltage impressed on said battery. Further, the switch 12 is provided with an auxiliary contact 19 adapted to engage and bridge a pair of contacts 20 for short-circuiting a resistance "$r^2$" when said switch is deënergized. The winding of switch 12 is connected by conductors 21 and 22 to opposite sides of the generator and hence is dependent for energization upon operation of said generator.

The generator is normally rendered idle by interruption of the ignition circuit of the engine 2. This circuit is controlled by electro-responsive switches 23, 24 and 25 which are normally deënergized to interrupt said circuit, whereby the lamp load must be initially thrown onto the battery. However, as will appear these switches function to effect automatic starting of the engine and automatic transfer of the load to the generator when the load exceeds a certain value while effecting automatic stopping of the engine and transfer of the load back to the battery when the load decreases to a certain value. Also as will appear switch 23 functions under the control of other means to start the engine for charging the battery whenever the battery charge is depleted to a given degree.

The switch 23 comprises a contact arm operable to engage contacts 26 and 27 to supply the generator with current from the battery and to complete the engine ignition circuit. Also the switch comprises a winding 28 to so move the arm, and additional windings 29 and 30. The winding 29 is coordinated with the winding 28 to act cumulatively therewith under certain conditions and to oppose the same under other conditions. The winding 30 is arranged adjacent to a tail piece 31 on the arm and when energized tends to hold said arm against movement.

The switch 24 controls the winding 28 of switch 23, said switch 24 being normally open. The switch 24 has its operating winding in series between the battery 3 and its load and said switch is so designed as to remain open until the current demand of the load rises to a certain value and then to respond. Thus, assuming that starting of the engine 2 is dependent upon response of the switch 24, the load up to a certain value will be supplied by the battery alone.

On the other hand when the load increases to a value causing response of switch 24, said switch energizes switch 23 which completes the ignition circuit of the engine 2 and furthermore completes connections between the battery 3 and the generator 1 to cause the latter to act as a motor for starting the engine 2. When the engine drives the generator at a sufficient speed the resultant voltage causes the response of the switch 12 thereby completing the circuit 4—5 and interrupting one side of the circuit 5—6. Moreover, the generator under such conditions delivers current to the windings 29 and 30 of switch 23, winding 29 thereupon functioning to oppose the winding 28 for release of said switch to interrupt motoring connections from the battery to the generator when the voltage of the latter increases to a given value. Winding 30, when so energized, functions to hold the switch 23 open so long as the generator continues to operate.

The switch 25 when energized serves to maintain the ignition circuit of the engine independently of switch 23 and said switch 25 has its operating winding in series with the generator. Thus said switch is energizable upon starting of the generator to permit opening of switch 23 without stopping the engine. Switch 25 however, is designed to release when the demand of the load circuit decreases to a given value and upon release it stops the engine, the switch 23 being open, and stopping of the engine and generator deënergizes the switch 12 to transfer the load back to the battery.

An ampere hour meter 33 is connected in the battery circuit and provided with contacts 34 and 35 to be engaged by the needle 36 of said meter under different conditions of charge of the battery. When the battery is discharged to a pre-determined degree the needle engages contact 34 to establish a circuit for the winding 28 of switch 23, in parallel to that established by switch 24. Thus the switch 23 is rendered responsive to start the engine 2 and thereby operate the generator for charging the battery whenever the charge of the latter is reduced to a pre-determined degree and as will appear the switch 25, which maintains the ignition circuits, has its winding connected in series in the battery charging circuit whereby the engine is maintained in operation until the battery charging circuit is opened. The battery charging circuit includes a normally closed electro-responsive switch 37 having its operating winding controlled by the contacts 35 and 36 of the ampere hour meter, said contacts being engageable to energize said switch and thereby interrupt the battery charging circuit when the battery is charged to a pre-determined degree.

Thus if the battery is fully charged any load up to a given maximum may be thrown on the battery alone, the load being automatically transferred to the generator when increased to exceed such maximum. Moreover, if a light load is imposed on the battery for such a length of time as to effect a given depletion of the battery charge such load is automatically transferred to the generator which is then maintained in operation until the battery is recharged to a given degree even though the load transferred from the battery to the generator is discontinued. On the other hand, if upon full charging of the battery the generator supplies a load within a given limit such load is thereupon transferred to the battery by release of switch 25 and subsequent release of switch 12. When the load is transferred to the battery the translating devices to be supplied thereby are likely to take an inrush current sufficient to momentarily energize switch 24 and in order to insure against undesired response of said switch a non-inductive resistance "$r^3$" is preferably connected in parallel with its operating winding.

More specifically describing the circuit arrangement the circuit of the winding of switch 24 may be traced from the right hand side of the battery 3 through the ampere hour meter by conductor 40 to and through the normally engaged contacts 13 and 14 of switch 12 by conductor 41 through said winding to line 6, whereby, as above stated the winding of switch 24 is connected in series between the battery and its load. Upon response of switch 24 circuit is completed from the right hand side of the battery by conductors 40 and 42 to and through said switch by conductor 43 through the winding 28 of switch 23 by conductors 44 and 45 to the opposite side of said battery. This energizes winding 28 to attract the arm which upon engaging the contact 27 completes circuit from the battery by conductors 40, 42 and 46 through said arm and contact by conductor 47 to the ignition device of the engine. Also engagement of the arm with contact 26 completes circuit from the battery to and through said arm and contact to and through the winding 29 by conductor 48 to and through the series field winding "$f$" of the generator by conductor 49 to and through the winding of switch 25 by conductor 50 to and through the armature "$a$" and shunt field winding "$f^1$" of the generator by conductor 45 to the battery. These connections provide for operation of the generator as a motor to start the engine and for energization of winding 29 to act cumulatively with winding 28.

When the engine starts it drives the generator causing the latter to supply current from one brush thereof by conductor 21 through the winding of switch 12 by conductor 22 to the other brush of said generator, which energizes said switch causing it to complete line 4 and to interrupt line 6 but only when the generator voltage has built up to a proper value. Also the generator sends current through the winding of switch 25, its series field "$f$" and the winding 29 of switch 24 in opposition to the battery current and hence when the generator voltage slightly preponderates the battery voltage the winding 29 is caused to oppose the winding 28 to effect release of switch 23. In the meantime, however, switch 25 is energized to complete circuit from the right hand side of battery by conductors 40 and 51 to and through said switch by conductor 52 to conductor 47 and thence to the ignition device of the engine whereby opening of switch 23 only interrupts the starting connections between the battery and generator. When open the switch 23 is so held by its winding 30, current being initially supplied to said winding from the generator by conductors 21 and 53 to and through the contacts 19 and 20 of switch 12 by conductor 54, thence through said winding by conductors 44 to the generator. However, upon response of switch 12 to disengage contacts 19 and 20 resistance "$r^2$" is included in this circuit to protect the winding 30 as the voltage of the generator builds up.

The battery charging connections may be traced from the right hand brush of the generator to the left hand terminal of the battery and from the opposite terminal of said battery to and through the ampere hour meter by conductor 56 to and through switch 37 by conductor 57 through resistance "$r^1$" by conductor 58 to and through contacts 17 and 18 of switch 12 and thence through the winding of switch 25 to the left hand brush of the generator. Thus as above stated the winding of switch 25 is connected in a series in the charging circuit to maintain the generator in operation until the charging circuit is opened by switch 37, the switch 12 also included in the charging circuit being maintained energized as long as the generator is in operation. The energizing circuit of switch 37 may be traced from the battery to and through contacts 36 and 35 of the ampere hour meter by conductor 59 to and through the winding of switch 37 by conductor 60 back to the battery.

Contacts 36 and 34 of the ampere hour meter complete circuit from the right hand terminal of the battery by conductors 61 and 43 to and through winding 28 of switch 23, thus paralleling the contacts of switch 24 to effect response of switch 23.

As will be apparent, closure of any one of the switches 10 connects one lamp 9 across the low voltage circuit 5—6 and one lamp 7 across the higher voltage circuit 4—5 but from the foregoing it will be apparent that one or the other of said lamps will be deenergized except during shifting of the load from one circuit to the other. Moreover, it will be apparent that the shifting of the load will be entirely automatic and that by designing the switch 12 to complete line 4 prior to interrupting line 6, transfer of the load may be made without interrupting the supply of light.

Upon closure of switch 11, the motor 8 is connected across the circuit 4—5 and if the generator is in operation it will at once be supplied with current. On the other hand if the generator is not in operation the connection of resistance "$r$" across the circuit 5—6 will increase the load on said circuit and this resistance may be so designed as to insure a load sufficient to cause immediate response of switch 24 to function as above described for starting of the generator.

What I claim as new and desire to secure by Letters Patent is:

1. In an electric generating system, in combination, a generator, an engine to drive said generator, a storage battery of lower voltage than said generator, translating circuits to be supplied by said generator and battery respectively, and means responsive to variations in the electrical conditions in the battery translating circuit to effect starting of said engine for operation of said generator to supply its translating circuit, said means upon so responding also effecting interruption of the battery translating circuit.

2. In an electric generating system, in combination, a generator, an engine to drive said generator, a storage battery of lower voltage than said generator, translating circuits to be supplied by said generator and battery respectively, and means responsive to variations in the load on the battery and the condition of the battery to effect starting of said engine for operation of said generator to supply its translating circuit, said means upon so responding also interrupting the battery translating circuit.

3. In an electric generating system, in combination, a generator, an engine for driving said generator, a storage battery of lower voltage than said generator and a three wire circuit affording two translating circuits to be supplied by said generator and battery respectively, means responsive to variations in electrical conditions in the battery translating circuit to effect starting of said engine for operation of said generator to supply its translating circuit, said means upon so responding also effecting disconnection of said battery from its translating circuit.

4. In an electric generating system, in combination, a generator, an engine for driving said generator, a battery of lower voltage than said generator, a three wire circuit affording two translating circuits to be supplied by said generator and battery respectively, and means responsive to variations in the load on the battery and the condition of the battery to effect starting of said engine for operation of said generator to supply its translating circuit, said means upon so responding also effecting interruption of the battery translating circuit.

5. In an electric generating system, in combination, a generator, an engine for driving said generator, a storage battery of lower voltage than said generator, translating circuits to be supplied by said generator and battery respectively and control means to effect starting and stopping of said engine and to interrupt the battery translating circuit when said generator operates to supply current to its translating circuit, said means being subjected to control by the electrical conditions in both translating circuits for automatic transfer of the electrical load from said battery to said generator and vice versa.

6. In an electric generating system, in combination, a generator, an engine for driving said generator, a storage battery of lower voltage than said generator, translating devices to be supplied by said generator, other translating devices to be supplied by said battery, control switches for said translating devices each adapted to make connections for one of the former and one of the latter devices, and means controlling the operation of said generator and the continuity of circuit between each set of translating devices and its source of supply said means being responsive to variations in load on the battery the condition of the battery for automatic transfer of the electrical load from said battery to said generator.

7. In an electric generating system, in combination, a generator, an engine for driving said generator, a storage battery of lower voltage than said generator, translating devices to be supplied by said generator, other translating devices to be supplied by said battery, control switches for said translating devices, each adapted to control a device to be supplied by said generator and a device to be supplied by said battery and means responsive to variations in the electrical conditions of the system to cause said generator and battery to supply their respective translating circuits selectively.

8. In an electric generating system, in combination, a generator, an engine to drive said generator, a storage battery of lower voltage than said generator, translating circuits to be supplied by said generator and battery respectively, said battery being normally connected to its respective translating circuit and said engine being normally idle and means to interrupt said battery translating circuit and to cause operation of said generator by said engine for supplying the other translating circuit when certain electrical conditions exist in the system.

9. In an electric generating system in combination, a generator, an engine for drivig said generator, a battery of lower voltage than said generator, a three wire circuit affording two translating circuits to be supplied by said generator and battery respectively, said battery being normally connected to its respective translating circuit and said engine being normally idle, and means responsive to variations in the electrical conditions in the system to interrupt said battery translating circuit and to cause operation of said generator by said engine for supplying current to the other translating circuit.

10. In an electric generating system, in combination, a generator, means for operating said generator, a storage battery of lower voltage than said generator, a three wire circuit affording two translating circuits to be supplied by said generator and battery respectively, a plurality of pairs of translating devices, one for inclusion in one of said circuits and the other for inclusion in the other of said circuits, a common control switch for each pair of translating devices, said generator being normally idle, whereby current is only available from said battery, and means for terminating the supply of current from the battery and for effecting operation of said generator to supply current to its respective translating devices when certain electrical conditions obtain in the system.

11. In an electric generating system, in combination, a generator, an engine for driving said generator, a storage battery of lower voltage than said generator to supply current thereto for operation thereof as a motor to start said engine, translating circuits to be supplied by said generator and battery respectively, and control means normally interrupting the starting connections between said battery and generator and connecting said battery to its respective translating circuit, said means being responsive to variations in the electrical conditions in that system to disconnect said battery from its translating circuit and to effect operation of said generator to supply current to its translating circuit.

12. In an electric generating system, in combination, a generator, an engine for driving said generator, a storage battery of lower voltage than said generator to supply current thereto for operation thereof as a motor to start said engine, translating circuits to be supplied by said generator and battery respectively, and control means normally interrupting the starting connections between said battery and generator and connecting said battery to its respective translating circuit, said means being responsive to variations in the electrical conditions in the system to disconnect said battery from its translating circuit, to effect operation of said generator to supply current to its translating circuit and to establish charging connections between said generator and said battery.

13. In an electric generating system, in combination, an engine driven generator, a storage battery of lower voltage than said generator, translating circuits to be supplied by said generator and said battery respectively, and means to effect starting and stopping of said generator, and to control the continuity of the battery translating circuit and also charging connections between said generator and battery, said means being subjected to control by variations in load on both translating circuits and also by variations in the condition of said battery, to render said translating circuits active selectively and to control charging of said battery.

14. In an electric generating system, in combination, an engine driven generator, a storage battery of lower voltage than said generator, a three wire circuit affording tranlating circuits to be supplied by said generator and battery respectively, and means to effect starting and stopping of said generator and to control the continuity of each of said translating circuits and the continuity of charging connections between said generator and battery, said means being subjected to control by variations in load on both translating circuits and also by variations in the condition of said battery, to render said translating circuits active selectively and to control charging of said battery.

15. In an electric generating system, in combination, an engine driven generator, a storage battery of lower voltage than said generator, a three wire circuit affording translating circuits to be supplied by said generator and battery respectively, means responsive to variations in the electrical conditions existing in the system to effect starting and stopping of said generator and means controlled by current supplied from said generator to control the continuity of both translating circuits and acting upon completion of either of said circuits to interrupt the other.

16. In an electric generating system, in combination, an engine driven generator, a storage battery of lower voltage than said generator, a three wire circuit affording two translating circuits to be supplied by said generator and battery respectively, translating devices to be connected in one of said circuits, other translating devices to be connected in the other of said circuits, common control switches for said devices each to establish connections for one device of each circuit, means responsive to variations in the electrical conditions in the system to effect starting and stopping of said generator, and means controlled by current supplied from said generator to control the continuity of both translating circuits and acting upon completion of either to interrupt the other.

17. In an electric generating system in combination, a generator, an engine to drive said generator, a storage battery of lower voltage than said generator, translating circuits to be supplied by said generator and battery respectively, means responsive to variations in the electrical conditions in the battery translating circuit to effect engine drive of said generator to supply its translating circuit and also to effect interruption of the battery translating circuit, a translating device to be connected to the generator translating circuit and means to connect said device in circuit and effect response of said means if said generator is idle.

18. In an electric generating system, in combination, a generator, an engine to drive said generator, a storage battery of lower voltage than said generator, translating circuits to be supplied by said generator and battery respectively, means responsive to variations in the electrical conditions in the battery translating circuit to effect starting of said engine for supplying current to said generator translating circuit and also to effect interruption of the battery translating circuit and means to connect a translating device to said generator translating circuit, said means including a resistance to be simultaneously connected to the battery circuit to effect response of said first-mentioned means if the generator is idle.

In witness whereof I have hereunto subscribed my name.

ROY M. VAN VLEET.